United States Patent
Chapaton et al.

(10) Patent No.: US 11,965,452 B1
(45) Date of Patent: Apr. 23, 2024

(54) METHODS FOR DETECTING CONTAMINATIONS IN VEHICLE COOLANT SYSTEMS

(71) Applicant: GM GLOBAL TECHNOLOGY OPERATIONS LLC, Detroit, MI (US)

(72) Inventors: Thomas J. Chapaton, Sterling Heights, MI (US); Nicholas Paul William Pieczonka, Windsor (CA); William Reginald Collin, Dearborn, MI (US); Ratandeep Singh Kukreja, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/101,436

(22) Filed: Jan. 25, 2023

(51) Int. Cl.
*F01P 11/14* (2006.01)
*G01N 31/22* (2006.01)

(52) U.S. Cl.
CPC .............. *F01P 11/14* (2013.01); *G01N 31/22* (2013.01); *F01P 2023/00* (2013.01); *F01P 2025/60* (2013.01)

(58) Field of Classification Search
CPC .... F01P 2025/60; F01P 2023/00; F01P 11/14; G01N 31/22
See application file for complete search history.

(56) References Cited

U.S. PATENT DOCUMENTS

| | | | |
|---|---|---|---|
| 10,227,903 | B2 | 3/2019 | Viola et al. |
| 10,428,703 | B2 | 10/2019 | Viola et al. |
| 10,669,904 | B2 | 6/2020 | Viola et al. |

FOREIGN PATENT DOCUMENTS

JP H0617901 B2 * 3/1994 ........... G01N 31/221

OTHER PUBLICATIONS

"FleetGuard Coolant Test Kit Strips 3 Way Each CC2602B," https://www.amazon.com/FleetGuard-Coolant-Test-Strips-CC2602B/dp/B073V88FKN, Amazon.com, Jul. 10, 2017). (Year: 2017).*
https://web.archive.org/web/20210410145853/https://www.acustrip.com/cgi-bin/proddesc.cgi?s=480508, Acustrip 480508 Series, "Acustrip The Diagnostic Detective," Apr. 10, 2021). (Year: 2021).*
Atinafu G/Mariam et al.; "Spectroscopic Determination of Fluoride Using Eriochrome Black T (EBT) as a Spectrophotometric Reagent from Groundwater"; International Journal of Analytical Chemistry, vol. 2021, Article ID 2045491; Dec. 28, 2021; 10 pages.
Mammen Denni et al.; "A critical evaluation on the reliability of two aluminum chloride chelation methods for quantification of flavonoids"; Food Chemistry 135; Jun. 7, 2012; pp. 1365-1368.
Yuanyuan Cao et al; "Portable colorimetric detection of copper ion in drinking water via red beet pigment and smartphone"; Microchemical Journal 150; Aug. 14, 2019; 6 pages.

(Continued)

*Primary Examiner* — Kevin A Lathers
(74) *Attorney, Agent, or Firm* — Harness, Dickey & Pierce, P.L.C.

(57) ABSTRACT

A method for detecting a contaminant in a vehicle coolant system during service includes contacting a chromophore impregnated strip and a heat transfer fluid sample, where the chromophore impregnated strip includes a complexing agent selected to form a complex with the contaminant that causes a color change in the chromophore impregnated strip and thereby indicates the presence of the contaminant in the heat transfer fluid sample.

18 Claims, 3 Drawing Sheets

(56) References Cited

OTHER PUBLICATIONS

Hye Yeon Lee et al.; "Rhodamine hydrazone derivatives based selective fluorescent and colorimetric chemodosimeters for $Hg^{2+}$ and selective colorimetric chemosensor for $Cu^{2+}$"; Sensors and Actuators B: Chemical, 182; Mar. 25, 2013; pp. 530-537.

Hong Shao et al.; "Ultra-facile and rapid colorimetric detection of $Cu^{2+}$ with branched polyethylenimine in 100% aqueous solution"; Analyst, vol. 143, No. 2; Jan. 2018; pp. 409-414.

* cited by examiner

METHODS FOR DETECTING CONTAMINATIONS IN VEHICLE COOLANT SYSTEMS

INTRODUCTION

This section provides background information related to the present disclosure which is not necessarily prior art.

Dissolved flux and/or other ionic compounds, for example, from various manufacturing processes, in cooling systems often causes problems, such as coolant gelling, which may require premature heat exchanger replacement. Early detection of dissolved flux and/or other ionic compounds, as a quality control measure during heat exchanger manufacture and/or during routine vehicle maintenance, can help to identify problems and initiate remedial actions prior to catastrophic failure (e.g., heat exchanger clogging resulting from coolant gelling). Contaminants can include, for example, aluminum, copper, and/or fluorine. There are, however, no current test methods for quantifying aluminum, copper, and/or fluorine during service, and after-service, outsourced or laboratory methods (e.g., ion chromatography and ion-selective electrodes for fluorine and inductively coupled plasma optical emission spectroscopy for aluminum and/or copper) are often expensive and time consuming and can require significant sample preparation and expert analysts. Accordingly, it would be desirable to develop testing kits and methods of using the same that can readily detect the presence of these and other contaminants, and quantify the same, while the heat exchanger is in service.

SUMMARY

This section provides a general summary of the disclosure and is not a comprehensive disclosure of its full scope or all of its features.

The present disclosure provides test kits and methods of using the same for detecting contaminants, including, for example, aluminum, copper, and/or fluorine, in vehicle coolant systems, and quantifying the same.

In various aspects, the present disclosure provides a method for detecting a contaminant in a vehicle coolant system during service. The method may include contacting a chromophore impregnated strip and a heat transfer fluid sample, where the chromophore impregnated strip includes a complexing agent selected to form a complex with the contaminant that causes a color change in the chromophore impregnated strip and thereby indicates the presence of the contaminant in the heat transfer fluid sample.

In one aspect, the complexing agent may be selected from the group consisting of: rhodamine hydrazides, branched polyethylenimines, gold nanoparticles, quercetin, myricetin, eriochrome black T, and combinations thereof.

In one aspect, the contaminant may include a compound that includes an element selected from the group consisting of: aluminum, copper, fluorine, and combinations thereof.

In one aspect, the method may further include obtaining the heat transfer fluid sample from the vehicle coolant system.

In one aspect, the heat transfer fluid sample may be obtained during a routine maintenance event.

In one aspect, the heat transfer fluid sample may be obtained as a quality control measure during heat exchanger manufacturing.

In one aspect, the method may further include diluting the heat transfer fluid sample prior to contacting the chromophore impregnated strip and the heat transfer fluid sample.

In one aspect, the diluting may include adding a solvent selected from the group consisting of: deionized water, methanol, ethanol, acetone, combinations thereof to the heat transfer fluid sample.

In one aspect, the method may further include pre-treating the heat transfer fluid sample prior to contacting the chromophore impregnated strip and the heat transfer fluid sample.

In one aspect, the pre-treating may include at least one of: contacting one or more surfactants to the heat transfer fluid sample to dissolve solids, filtering the heat transfer fluid sample to remove solids, and adjusting the pH of the heat transfer fluid sample.

In one aspect, the method may further include evaluating the color change by comparing the chromophore impregnated strip after contacting with the heat transfer fluid sample with a reference chart.

In one aspect, the evaluating may be performed by a device comprising a processor.

In various aspects, the present disclosure provides a method for detecting contaminants in a vehicle coolant system during service. The method may include contacting a chromophore impregnated strip and a heat transfer fluid sample, where the chromophore impregnated strip includes a first complexing agent and a second complexing agent distinct from the first complexing agent. The first complexing agent may be selected to form a complex with a first contaminant that causes a first color change in the chromophore impregnated strip at a first location indicating the presence of the first contaminant in the heat transfer fluid sample. The second complexing agent may be selected to form a complex with a second contaminant that causes a second color change in the chromophore impregnated strip at a second location indicating the presence of the second contaminant in the heat transfer fluid sample.

In one aspect, the first and second complexing agents may be independently selected from the group consisting of: rhodamine hydrazides, branched polyethylenimines, gold nanoparticles, quercetin, myricetin, eriochrome black T, and combinations thereof.

In one aspect, the first and second contaminants may include one or more compounds that include elements independently selected from the group consisting of: aluminum, copper, fluorine, and combinations thereof.

In one aspect, the method may further include diluting the heat transfer fluid sample prior to contacting the chromophore impregnated strip and the heat transfer fluid sample.

In one aspect, the method may further include pre-treating the heat transfer fluid sample prior to contacting the chromophore impregnated strip and the heat transfer fluid sample.

In one aspect, the method may further include evaluating the first and second color changes by comparing the chromophore impregnated strip after contacting with the heat transfer fluid sample with a reference chart. The reference chart may include first and second colors representing the first and second contaminants and also different color intensities strengths for the first and second colors used to quantify amounts of the first and second contaminants.

In one aspect, the evaluating may be performed by a device comprising a processor.

In various aspects, the present disclosure provides a kit for detecting a contaminant in a vehicle coolant system during service. The kit may include a chromophore impregnated strip that includes a complexing agent selected to form a complex when contacted to the contaminant and that causes a color change in the chromophore impregnated strip indicating the presence of the contaminant.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
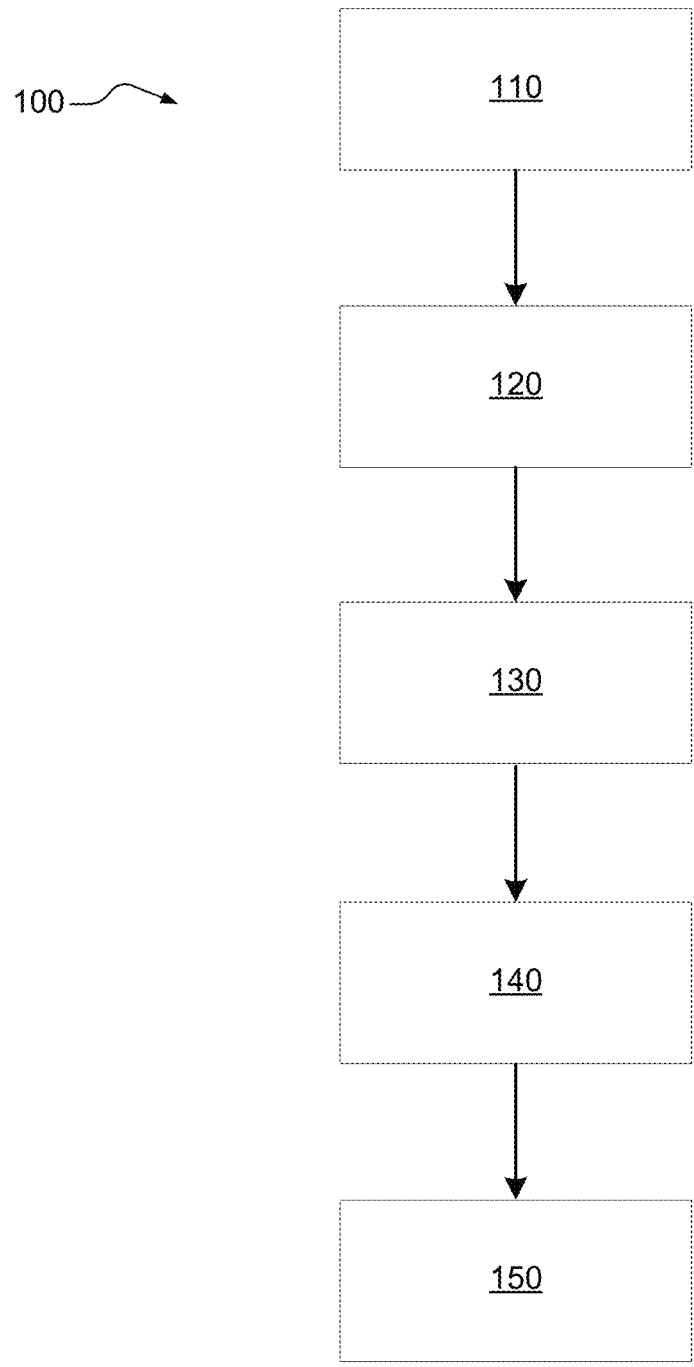
FIG. 1 is a flowchart illustrating an example method for detecting and quantifying contaminants in vehicle coolant systems.

Example embodiments are provided so that this disclosure will be thorough and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figure. Spatially or temporally relative terms may be intended to encompass different orientations of the device or system in use or operation in addition to the orientation depicted in the figure.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python@.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Example embodiments will now be described more fully with reference to the accompanying drawings.

In various aspects, the present disclosure provides test kits and methods of using the same for detecting contaminants, including, for example, aluminum, copper, and/or fluorine, in vehicle coolant systems, and quantifying the same. For example, as illustrated in FIG. 1, an example method 100 for detecting contaminates includes obtaining or sampling 110 a heat transfer fluid sample (e.g., coolant sample). In certain variations, sampling 110 the heat transfer fluid may include removing a portion of the heat transfer fluid from a vehicle coolant system in question. The heat transfer fluid sample may be obtained during a routine maintenance event, or during a quality control step while manufacturing a heat exchange for the vehicle.

The method 100 further includes contacting or exposing 140 a test strip to the heat transfer fluid sample and interpreting or evaluating 150 color changes on the test strip. For example, in certain variations, a first end of the test strip may be contacted or exposed to the heat transfer fluid sample. The test strip may be a chromophore impregnated strip (CIS) including a support material (also referred to as a base material) impregnated with one or more complexing agents (also referred to as dye/metal complexes) for colorimetric testing. The support material is selected to facilitate separative transport of one or more analytes (e.g., contaminants) along a length of the strip. In certain variations, the support material may include a filter paper including cellulose fibers. In other variations, the support material may include a plastic or glass film coated with a separation media (e.g., silica gel and/or alumina).

Figure 2:
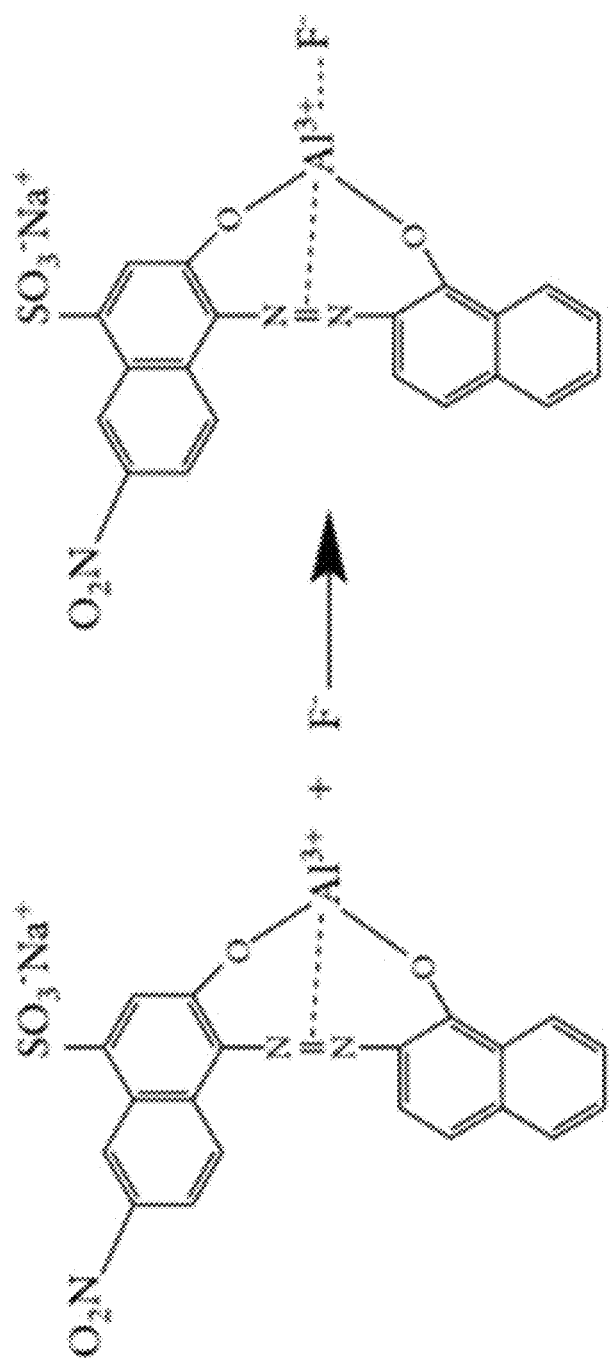
FIG. 2 illustrates an example complexing agent that may be used to detect and quantify fluorine in accordance with the method illustrated in FIG. 1.
Figure 3:
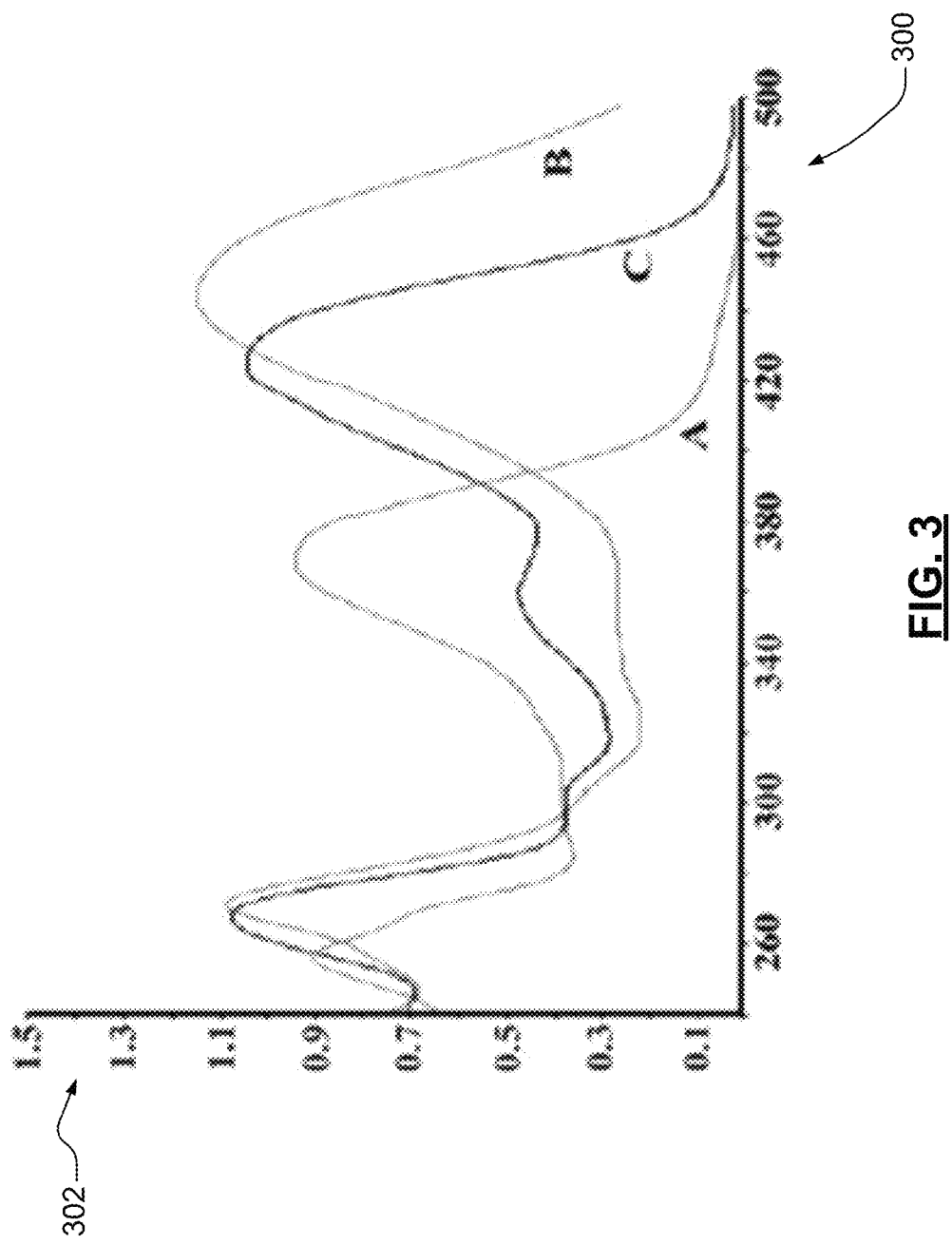
FIG. 3 is a graphical illustration demonstrating wavelengths of aluminum-quercetin complexes as compared to non-bonded quercetin.

The one or more complexing agents are selected to interact with one or more analyte. For example, one or more of the complexing agents may be selected to form colorimetric complexes with one or more of the analytes resulting in a color change. For example, an example complexing agent as represented in FIG. 2 may react with fluorine to form a pink color on the test strip. Further, as illustrated in FIG. 3, aluminum any react with an example complexing agent, quercetin. For example, as illustrated, the quercetin (A) may change from blue to red or black representing the as-formed aluminum-quercetin complexes B and C. The x-axis 300 represents wavelengths (nm), and the y-axis 302 represents absorbance units (A).

The one or more complexing agents may be strongly binding ligands having a chromophore in the visible range. For example, in certain variations, the one or more complexing agents may include rhodamine hydrazides, branched polyethylenimines, gold nanoparticles, quercetin, myricetin, Eriochrome Black T, the like, and any combination thereof. The rhodamine hydrazides, branched polyethylenimines, and/or gold nanoparticles may form colorimetric complexes with copper ($Cu^{2+}$). The quercetin and/or myricetin may form colorimetric complexes with aluminum ($Al^{3+}$). The Eriochrome Black T may for colorimetric complexes with fluorine ($F^-$).

With renewed reference to FIG. 1, when the test strip contacts 140 the cooling solution sample, the cooling solution sample may be drawn from the first end of the test strip towards a second distal end of the test strip by capillary action. As the heat transfer fluid sample is drawn through the test strip, interactions between dissolved complexing agents and the support media provide separative transport of the analytes (i.e. contaminants) according to the principles of solid-liquid chromatography. The interpreting or evaluating 150 may include visually comparing the used test strip to a reference chart. The reference chart may include a plurality of color samples, including different colors representing different contaminants, and also different color strengths or intensities which can be used to quantify analyte/contaminate amounts. The appropriate reference charts may be included with (e.g., packaged with) the test strip and provided in the form of a kit. In certain variations, the interpreting to evaluating 150 may occur using a device including a processor, such as via an application for a smartphone. The process for the device may be programed to identify colors representing particular contaminants and also to quantify contaminate amounts by categorizing the strength or vibrancies of the identified colors.

In various aspects, the method 100 may also include diluting 120 and/or pre-treating 130 the heat transfer fluid sample prior to contacting 140 the test strip to the heat transfer fluid sample. For example, if the analyte concentration is beyond the calibration range of the particular reference chart, the heat transfer fluid sample may be diluted 120. The heat transfer fluid sample may be diluted by contacting the heat transfer fluid sample with deionized water, methanol, ethanol, acetone, and/or any other solvent suitable to the selected complexation reaction. The diluent may be included in the kit including the reference charts and/or test strips. The kit may also include one or more collection vessels for holding the heat transfer fluid sample and/or one or more collection means (e.g., pipette and/or syringe) for collecting the heat transfer fluid sample and/or contacting the diluent with the heat transfer fluid sample.

The heat transfer fluid sample may be pre-treated 130 so as to release analytes (i.e., contaminants including, for example, aluminum, copper, and/or fluorine) from existing complexes. For example, pre-treating 130 the heat transfer fluid sample may include contacting one or more surfactants to the heat transfer fluid sample where the one or more surfactants are selected to dissolve solids and/or filtrating the heat transfer fluid sample to remove the solids and/or adjusting the pH of the heat transfer fluid sample dependent upon the selected complexing agents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for detecting a contaminant in a vehicle coolant system during service, the method comprising:
    contacting a chromophore impregnated strip and a heat transfer fluid sample, the chromophore impregnated strip comprising a complexing agent selected from the group consisting of: rhodamine hydrazides, branched polyethylenimines, gold nanoparticles, quercetin, myricetin, eriochrome black T, and combinations thereof, the complexing agent forming a complex with the contaminant to indicate the presence of the contaminant in the heat transfer fluid sample.

2. The method of claim 1, wherein the contaminant comprises a compound comprising an element selected from the group consisting of: aluminum, copper, fluorine, and combinations thereof.

3. The method of claim 1, wherein the method further comprises obtaining the heat transfer fluid sample from the vehicle coolant system.

4. The method of claim 3, wherein the heat transfer fluid sample is obtained during a routine maintenance event.

5. The method of claim 3, wherein the heat transfer fluid sample is obtained as a quality control measure during heat exchanger manufacturing.

6. The method of claim 1, wherein the method further comprises diluting the heat transfer fluid sample prior to contacting the chromophore impregnated strip and the heat transfer fluid sample.

7. The method of claim 6, wherein the diluting comprises adding a solvent selected from the group consisting of: deionized water, methanol, ethanol, acetone, combinations thereof to the heat transfer fluid sample.

8. The method of claim 1, wherein the method further comprises pre-treating the heat transfer fluid sample prior to contacting the chromophore impregnated strip and the heat transfer fluid sample.

9. The method of claim 8, wherein the pre-treating comprises at least one of:
contacting one or more surfactants to the heat transfer fluid sample to dissolve solids;
filtering the heat transfer fluid sample to remove solids; and
adjusting the pH of the heat transfer fluid sample.

10. The method of claim 1, wherein the method further comprises evaluating the color change by comparing the chromophore impregnated strip after contacting with the heat transfer fluid sample with a reference chart.

11. The method of claim 10, wherein the evaluating is performed by a device comprising a processor.

12. A method for detecting contaminants in a vehicle coolant system during service, the method comprising:
contacting a chromophore impregnated strip and a heat transfer fluid sample, the chromophore impregnated strip comprising a first complexing agent and a second complexing agent distinct from the first complexing agent, the first complexing agent being selected to form a complex with a first contaminant that causes a first color change in the chromophore impregnated strip at a first location indicating the presence of the first contaminant in the heat transfer fluid sample, and the second complexing agent being selected to form a complex with a second contaminant that causes a second color change in the chromophore impregnated strip at a second location indicating the presence of the second contaminant in the heat transfer fluid sample, and the first and second contaminants comprising one or more compounds comprising elements independently selected from the group consisting of: aluminum, copper, fluorine, and combinations thereof.

13. The method of claim 12, wherein the first and second complexing agents are independently selected from the group consisting of: rhodamine hydrazides, branched polyethylenimines, gold nanoparticles, quercetin, myricetin, eriochrome black T, and combinations thereof.

14. The method of claim 12, wherein the method further comprises diluting the heat transfer fluid sample prior to contacting the chromophore impregnated strip and the heat transfer fluid sample.

15. The method of claim 12, wherein the method further comprises pre-treating the heat transfer fluid sample prior to contacting the chromophore impregnated strip and the heat transfer fluid sample.

16. The method of claim 12, wherein the method further comprises evaluating the first and second color changes by comparing the chromophore impregnated strip after contacting with the heat transfer fluid sample with a reference chart, wherein the reference chart comprises first and second colors representing the first and second contaminants and also different color intensities strengths for the first and second colors used to quantify amounts of the first and second contaminants.

17. The method of claim 12, wherein the evaluating is performed by a device comprising a processor.

18. A kit for detecting a contaminant in a vehicle coolant system during service, the kit comprising: a chromophore impregnated strip comprising a complexing agent selected to form a complex when contacted to the contaminant that causes a color change in the chromophore impregnated strip indicating the presence of the contaminant; and the complexing agent selected from the group consisting of: rhodamine hydrazides, branched polyethylenimines, gold nanoparticles, quercetin, myricetin, eriochrome black T, and combinations thereof.

* * * * *